United States Patent [19]
Yoon

[11] Patent Number: 5,909,363
[45] Date of Patent: Jun. 1, 1999

[54] INITIAL DRIVE VOLTAGE SUPPLY CONTROL CIRCUIT FOR SWITCHING MODE POWER SUPPLY

[75] Inventor: Kyung Choon Yoon, Kyungki-do, Rep. of Korea

[73] Assignee: SamSung Electronics Co., Ltd., Kyungki-do, Rep. of Korea

[21] Appl. No.: 09/087,995

[22] Filed: Jun. 1, 1998

[30] Foreign Application Priority Data

May 30, 1997 [KR] Rep. of Korea ............. 97-22262

[51] Int. Cl.⁶ ............................................ H02M 3/335
[52] U.S. Cl. ............................................... 363/21
[58] Field of Search .......................... 363/19, 20, 21, 363/95, 97, 131

[56] References Cited

U.S. PATENT DOCUMENTS

| | | | |
|---|---|---|---|
| 3,924,172 | 12/1975 | Gregorich | 363/21 |
| 5,414,610 | 5/1995 | Brainard | 363/21 |
| 5,506,764 | 4/1996 | Hon et al. | 363/21 |
| 5,815,382 | 9/1998 | Saint-Pierre et al. | 363/21 |

Primary Examiner—Matthew Nguyen
Attorney, Agent, or Firm—Robert E. Bushnell, Esq.

[57] ABSTRACT

An initial drive voltage supply control circuit for an SMPS, comprising a rectifier for rectifying and smoothing an AC voltage inputted by an AC input unit to convert it into a DC voltage, a switching transformer having a primary coil for receiving the DC voltage from the rectifier and secondary and tertiary coils for inducing desired voltages in response to the DC voltage received by the primary coil, an output power controller for supplying or blocking the DC voltage from the rectifier to the primary coil of the switching transformer, an initial drive voltage controller for supplying an initial drive voltage to the output power controller and blocking the initial drive voltage to the output power controller when a normal drive voltage is supplied to the output power controller after the lapse of a predetermined time, a load output unit for rectifying and smoothing the voltage induced in the secondary coil of the switching transformer to output an operating voltage to a load, a drive voltage supply unit for rectifying and smoothing the voltage induced in the tertiary coil of the switching transformer to supply the normal drive voltage to the output power controller, and an error detection feedback unit for detecting the operating voltage from the load output unit and feeding the detected operating voltage back to the output power controller.

13 Claims, 4 Drawing Sheets

INITIAL DRIVE VOLTAGE SUPPLY CONTROL CIRCUIT FOR SWITCHING MODE POWER SUPPLY

CLAIM OF PRIORITY

This application makes reference to, incorporates the same herein, and claims all benefits accruing under 35 U.S.C § 119 from an application entitled *Initial Drive Voltage Supply Control Circuit For Switching Mode Power Supply* earlier filed in the Korean Industrial Property Office on May 30, 1997, and there duly assigned Serial No. 97-22262 by that Office.

BACKGROUND OF THE INVENTION

1. Field of the Invention

The present invention relates in general to a switching mode power supply (referred to hereinafter as SMPS) for supplying a stable operating voltage according to power consumption of a load, and more particularly to an initial drive voltage supply control circuit for the SMPS which is capable of initially supplying an output voltage from a rectifier as an initial drive voltage to an output power controller which generates a switching pulse width modulation (referred to hereinafter as PWM) signal and then blocking the output voltage from the rectifier to the output power controller.

2. Description of the Prior Art

Switching mode power supplies having an initial drive voltage control circuit are generally known. An example of such a SMPS is proved by U.S. Pat. No. 5,452,196 to Steffen Lehr et al. entitled *Start-Up Circuit For A Switch Mode Power Supply*.

Additionally, it is known that a SMPS rectifies and smooths a commercial alternating current (AC) voltage to convert it into a direct current (DC) voltage. Then, the SMPS adjusts an output duty ratio of the DC voltage by means of a PWM circuit to supply a desired operating voltage to a load through a switching transformer. Also, a variation in the operating voltage supplied to the load is fed back to the PWM circuit to adjust a duty ratio of a DC voltage to the switching transformer, so as to stabilize the operating voltage to the load.

Noticeably, the PWM circuit is initially operated in response to the initial drive voltage from an initial drive voltage supply unit provided with an initial drive voltage supply resistor. Thereafter, at the normal state, the PWM circuit is operated in response to a drive voltage from a drive voltage supply unit which is generated on the basis of the voltage induced in the tertiary coil of a switching transformer.

However, both of the above-mentioned switching mode power supplies have a disadvantage in that current continuously flows to an initial drive voltage supply resistor even at the normal state after the initial drive voltage is initially supplied to the PWM circuit through the initial drive voltage supply resistor. Because current continuously flows to the initial drive voltage supply resistor even at the normal state, unnecessary power is consumed. Further, the initial drive voltage supply resistor must have a high power capacity to reduce its overheat resulting from a self-overcurrent.

SUMMARY OF THE INVENTION

Therefore, the present invention has been made in view of the above problems, and it is an object of the present invention to provide an initial drive voltage supply control circuit for an SMPS which is capable of controlling the supply of an initial drive voltage to an output power controller which generates a switching PWM signal.

In accordance with the present invention, the above and other objects can be accomplished by a provision of an initial drive voltage supply control circuit for a switching mode power supply, comprising a rectifier for rectifying and smoothing an AC voltage inputted by an AC input unit to convert it into a DC voltage; a switching transformer having a primary coil for receiving the DC voltage from the rectifier and secondary and tertiary coils for inducing desired voltages in response to the DC voltage received by the primary coil; an output power controller for supplying or blocking the DC voltage from the rectifier to the primary coil of the switching transformer; an initial drive voltage controller for supplying an initial drive voltage to the output power controller and blocking the initial drive voltage to the output power controller when a normal drive voltage is supplied to the output power controller after the lapse of a predetermined time; a load output unit for rectifying and smoothing the voltage induced in the secondary coil of the switching transformer to output an operating voltage to a load; a drive voltage supply unit for rectifying and smoothing the voltage induced in the tertiary coil of the switching transformer to supply the normal drive voltage to the output power controller; and an error detection feedback unit for detecting the operating voltage from the load output unit and feeding the detected operating voltage back to the output power controller.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
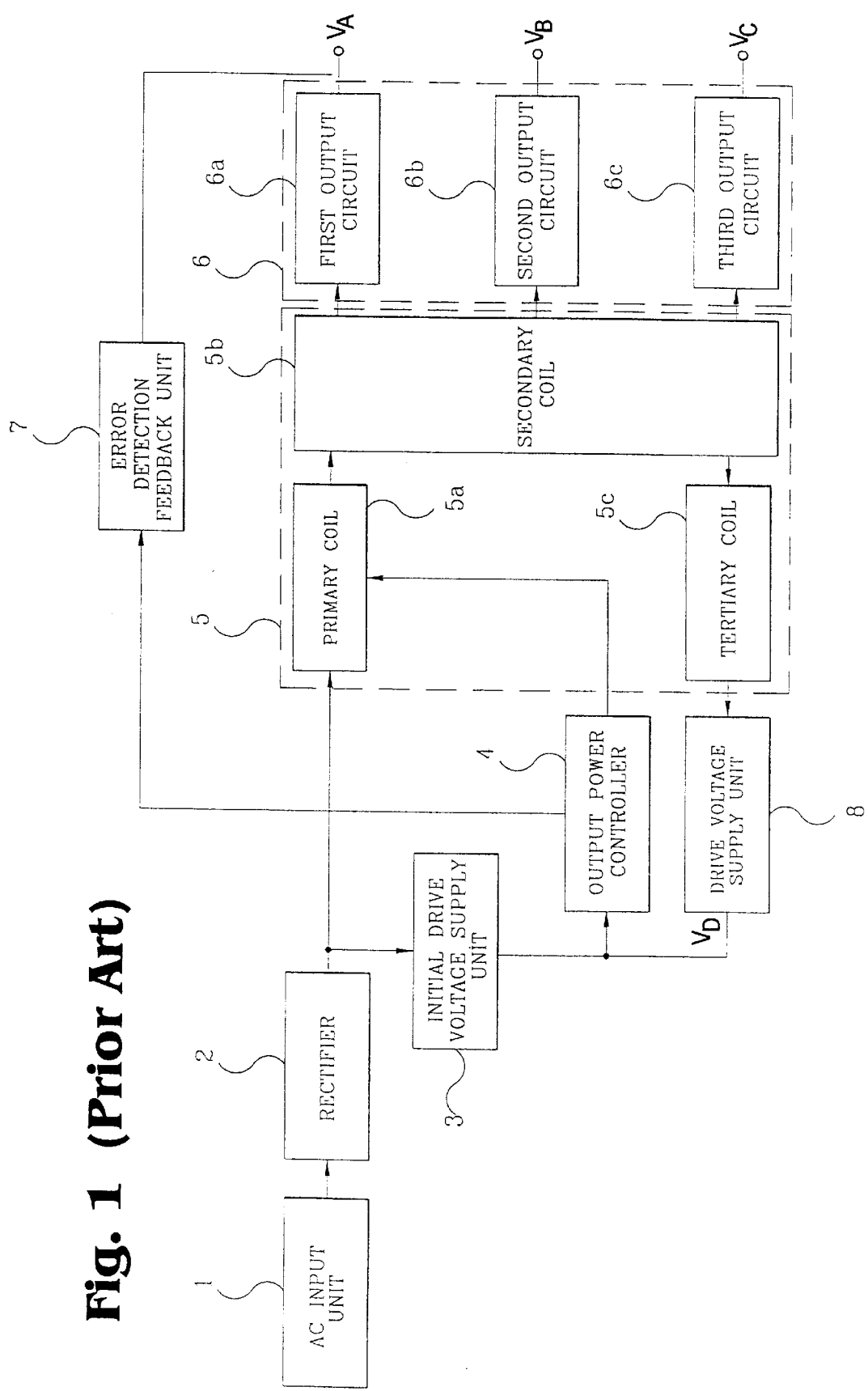
FIG. 1 is a block diagram of a conventional SMPS.
Figure 2:
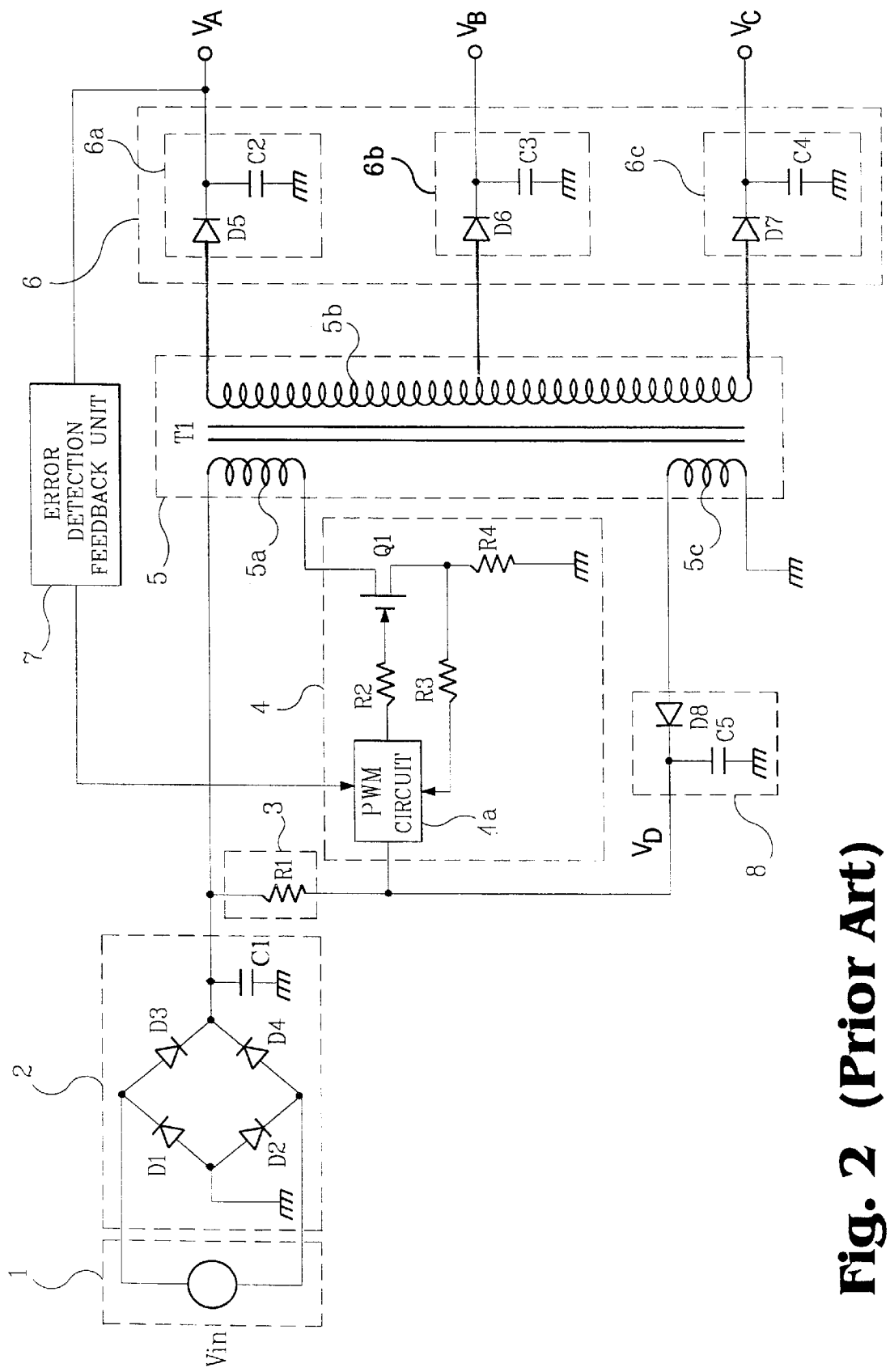
FIG. 2 is a detailed circuit diagram of the conventional SMPS in FIG. 1.

FIG. 1 is a block diagram of an exemplary SMPS and FIG. 2 is a detailed circuit diagram of the conventional SMPS in FIG. 1.

As shown in FIG. 1, the SMPS comprises an AC input unit 1 for inputting an external AC voltage Vin, a rectifier 2 for rectifying and smoothing the AC voltage Vin inputted by the AC input unit 1 to convert it into a DC voltage, a switching transformer 5 having a primary coil 5a for receiving the DC voltage from the rectifier 2 and secondary and tertiary coils 5b and 5c for inducing desired voltages in response to the DC voltage received by the primary coil 5a, an output power controller 4 for supplying or blocking the DC voltage from the rectifier 2 to the primary coil 5a of the switching transformer 5, and an initial drive voltage supply unit 3 for supplying the DC voltage from the rectifier 2, as an initial drive voltage, to the output power controller 4.

The DC voltage from the rectifier 2 is applied to the primary coil 5a of the switching transformer 5 during a high pulse duration of a control signal from the output power controller 4. The secondary and tertiary coils 5b and 5c of the switching transformer 5 have different turn ratios.

The SMPS further comprises a load output unit 6 for rectifying and smoothing the voltage induced in the secondary coil 5b of the switching transformer 5 to output desired operating voltages $V_A$, $V_B$ and $V_C$ respectively to loads, and a drive voltage supply unit 8 for rectifying and smoothing the voltage induced in the tertiary coil 5c of the switching transformer 5 to supply a drive voltage $V_D$ to the output power controller 4.

The SMPS further comprises an error detection feedback unit 7 for detecting a variation in the operating voltage $V_A$ from the load output unit 6, supplied to the load, and feeding the detected variation back to the output power controller 4 to adjust an output duty ratio of the DC voltage from the rectifier 2 which is applied to the primary coil 5a of the switching transformer 5, so as to stabilize the operating voltages $V_A$, $V_B$ and $V_C$ to the loads.

Referring to FIG. 2, the rectifier 2 includes bridge diodes D1–D4 for rectifying the AC voltage Vin inputted by the AC input unit 1, and a smoothing capacitor C1 connected to an output terminal of the bridge diodes D3 and D4, for smoothing a full wave-rectified voltage from the rectifier 2.

The smoothing capacitor C1 in the rectifier 2 is connected to the primary coil 5a of the switching transformer 5 which induces DC voltages in the secondary and tertiary coils 5b and 5c of the switching transformer 5.

The load output unit 6 includes first to third output circuits 6a–6c for rectifying and smoothing the voltage induced in the secondary coil 5b of the switching transformer 5 to output the different operating voltages $V_A$, $V_B$ and $V_C$ respectively to the loads. To this end, each of the first to third output circuits 6a, 6b and 6c is respectively provided with a rectifying diode D5, D6 and D7 and a smoothing capacitor C2, C3 and C4.

The drive voltage supply unit 8 is adapted to rectify and smooth the voltage induced in the tertiary coil 5c of the switching transformer 5 to supply the drive voltage $V_D$ to the output power controller 4. To this end, the drive voltage supply unit 8 includes a rectifying diode D8 and a smoothing capacitor C5.

The output power controller 4 includes a field effect transistor (referred to hereinafter as FET) Q1 for controlling the supply of the DC voltage from the rectifier 2 to the primary coil 5a of the switching transformer 5, a PWM circuit 4a for outputting a control signal to a gate of the FET Q1 through a resistor R2 to periodically turn on/off the FET Q1, and resistors R3 and R4 for detecting an overcurrent of the FET Q1 and applying the detected overcurrent to the PWM circuit 4a.

The initial drive voltage supply unit 3 is provided with an initial drive voltage supply resistor R1. Initially, the initial drive voltage supply resistor R1 supplies the DC voltage from the rectifier 2 as the initial drive voltage to the PWM circuit 4a. Then, at the normal state, the initial drive voltage supply resistor R1 functions to supply the drive voltage $V_D$ from the drive voltage supply unit 8 to the PWM circuit 4a.

The operation of the SMPS with the above-mentioned construction will hereinafter be described.

First, the external AC voltage Vin is input by the AC input unit 1 and then rectified and smoothed by the bridge diodes D1–D4 and smoothing capacitor C1 in the rectifier 2. As a result, the external AC voltage Vin is converted into a desired DC voltage.

The DC voltage from the rectifier 2 is applied respectively to the primary coil 5a of the switching transformer 5 and the initial drive voltage supply unit 3.

In the initial drive voltage supply unit 3, the DC voltage from the rectifier 2 is supplied as the initial drive voltage to the PWM circuit 4a in the output power controller 4 through the initial drive voltage supply resistor R1.

In the output power controller 4, the DC voltage from the rectifier 2 is applied to a drain of the FET Q1 through the primary coil 5a of the switching transformer 5. At the same time, the PWM circuit 4a is driven in response to the initial drive voltage from the initial drive voltage supply unit 3 to apply a switching control signal to the gate of the FET Q1 through the resistor R2. As a result, the FET Q1 is rapidly turned on.

Thereafter, if a voltage at a source of the FET Q1 is rapidly raised due to an increase in current at the drain of the FET Q1, an overcurrent is detected by the resistors R3 and R4 and applied to the PWM circuit 4a. As a result, the PWM circuit 4a turns the FET Q1 off.

At the moment that the FET Q1 is turned off, instantaneous counter electromotive forces are generated respectively at the secondary and tertiary coils 5b and 5c of the switching transformer 5, thereby causing current to flow through the diodes D5–D8 in the first to third output circuits 6a–6c and drive voltage supply unit 8. When the flowing current becomes zero, the FET Q1 is gain turned on.

The voltages, which are induced in the secondary and tertiary coils 5b and 5c of the switching transformer 5 through the above-mentioned switching operation of the output power controller 4, are rectified and smoothed by the diodes D5–D8 and capacitors C2–C5 in the first to third output circuits 6a–6c and drive voltage supply unit 8, respectively. As a result, the operating voltages $V_A$, $V_B$, $V_C$ and $V_D$ are generated.

Noticeably, the PWM circuit 4a is initially operated in response to the initial drive voltage from the initial drive voltage supply unit 3. Thereafter, at the normal state, the PWM circuit 4a is operated in response to the drive voltage $V_D$ from the drive voltage supply unit 8 which is generated on the basis of the voltage induced in the tertiary coil 5c of the switching transformer 5.

On the other hand, the operating voltage from the load output unit 6, supplied to the load, may be varied according to power consumption of the load. Such a variation is detected by the error detection feedback unit 7 and fed back to the PWM circuit 4a. Then, on the basis of the detected variation, the PWM circuit 4a adjusts the output duty ratio of the DC voltage from the rectifier 2 which is applied to the primary coil 5a of the switching transformer 5. Hence, the first to third output circuits 6a–6c can supply stable operating voltages to the loads.

However, the above-mentioned SMPS has a disadvantage in that current continuously flows to the initial drive voltage supply resistor even at the normal state after the initial drive voltage is initially supplied to the PWM circuit through the initial drive voltage supply resistor. Because current continuously flows to the initial drive voltage supply resistor even at the normal state, unnecessary power is consumed.

Figure 3:
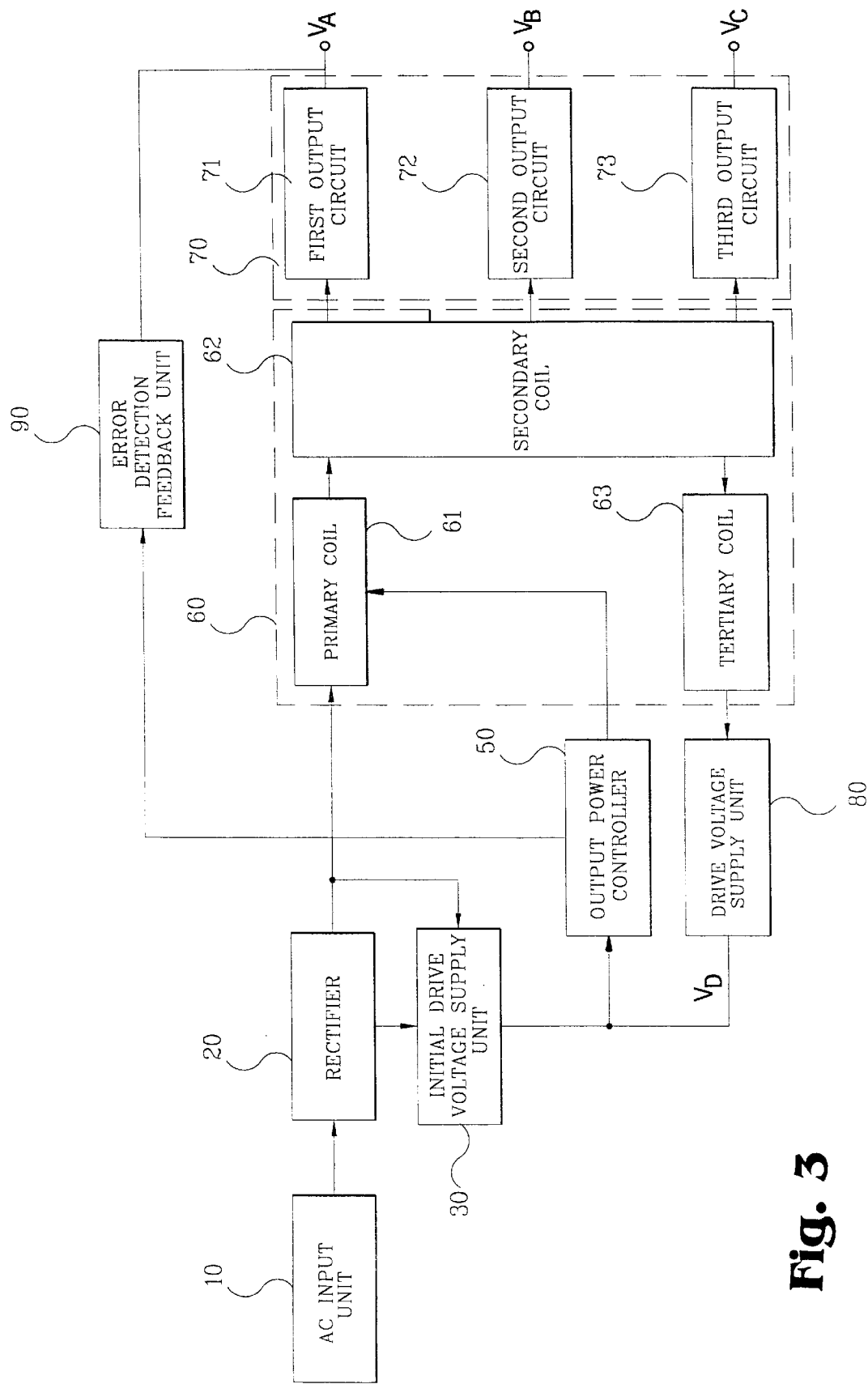
FIG. 3 is a block diagram of an SMPS with an initial drive voltage supply control circuit of the present invention.
Figure 4:
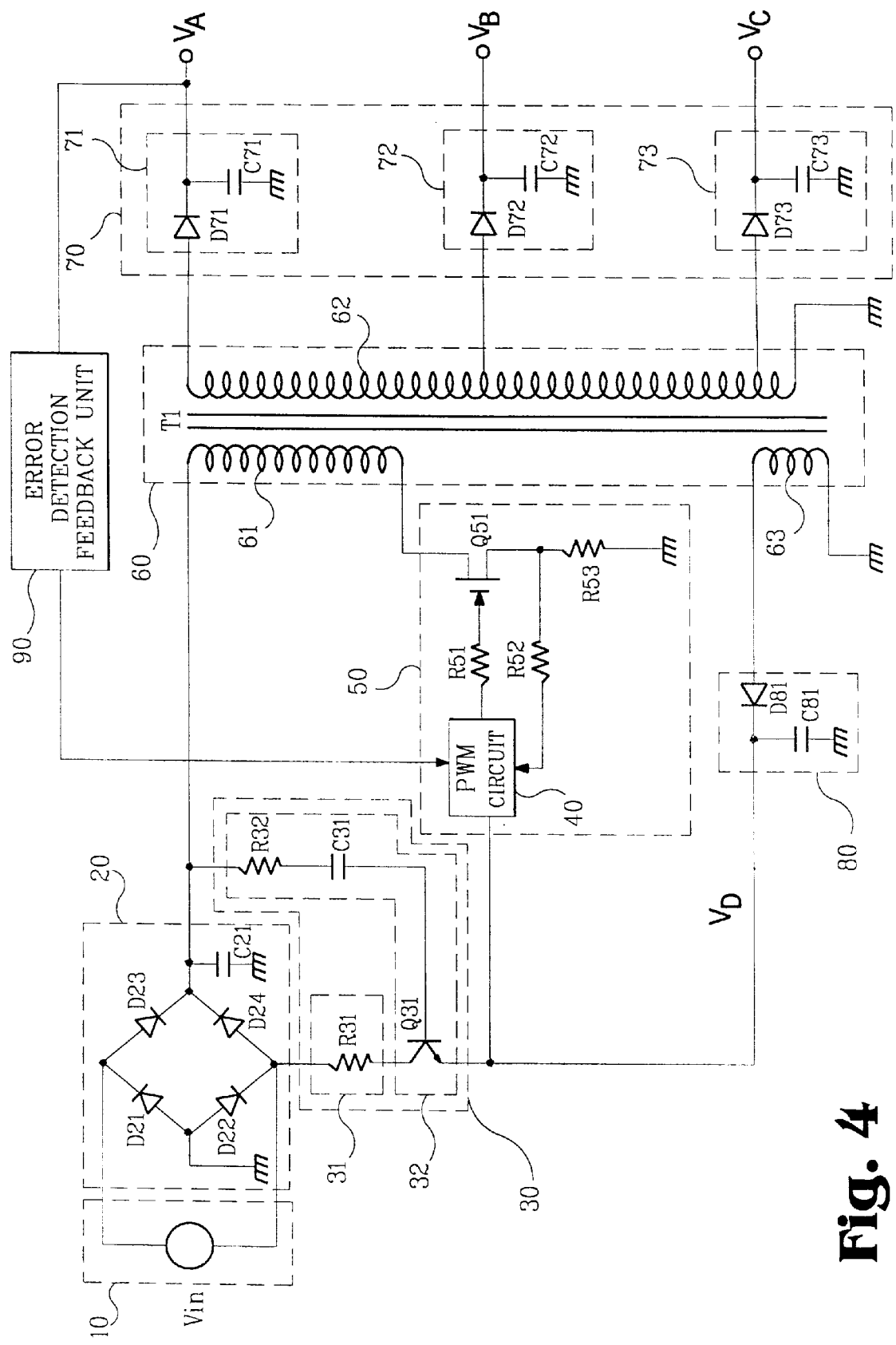
FIG. 4 is a detailed circuit diagram of the SMPS in FIG. 3.

FIG. 3 is a block diagram of an SMPS with an initial drive voltage supply control circuit according to the principles of the present invention and FIG. 4 is a detailed circuit diagram of the SMPS in FIG. 3.

As shown in FIG. 3, the SMPS comprises an AC input unit 10 for inputting an external AC voltage Vin, a rectifier 20 for rectifying and smoothing the AC voltage Vin inputted by the AC input unit 10 to convert it into a DC voltage, and a switching transformer 60 having a primary coil 61 for receiving the DC voltage from the rectifier 20 and secondary and tertiary coils 62 and 63 for inducing desired voltages in response to the DC voltage received by the primary coil 61. The secondary and tertiary coils 62 and 63 of the switching transformer 60 have different turn ratios.

The SMPS further comprises an output power controller 50 for supplying or blocking the DC voltage from the rectifier 20 to the primary coil 61 of the switching transformer 60, and an initial drive voltage controller 30 for supplying an initial drive voltage to the output power controller 50 and blocking the initial drive voltage to the output power controller 50 when a DC drive voltage $V_D$ is supplied to the output power controller 50 after the lapse of a predetermined time.

The SMPS further comprises a load output unit 70 for rectifying and smoothing the voltage induced in the secondary coil 62 of the switching transformer 60 to output desired DC operating voltages $V_A$, $V_B$ and $V_C$ respectively to loads. To this end, the load output unit 70 is provided with first to third output circuits 71–73, each of which includes a rectifying diode D71, D72 and D73 and a smoothing capacitor C71, C72 and C73, respectively, as shown in FIG. 4.

The SMPS further comprises a drive voltage supply unit 80 for rectifying and smoothing the voltage induced in the tertiary coil 63 of the switching transformer 60 to supply the drive voltage $V_D$ to the output power controller 50. To this end, the drive voltage supply unit 80 includes a rectifying diode D81 and a smoothing capacitor C81, as shown in FIG. 4.

The SMPS further comprises an error detection feedback unit 90 for detecting a variation in the operating voltage $V_A$ from the load output unit 70, supplied to the load, and feeding the detected variation back to the output power controller 50 to adjust an output duty ratio ofthe DC voltage from the rectifier 20 which is applied to the primary coil 61 of the switching transformer 60, so as to stabilize the operating voltages $V_A$, $V_B$ and $V_C$ to the loads.

As shown in FIG. 4, the rectifier 20 includes bridge diodes D21–D24 for rectifying the AC voltage Vin inputted by the AC input unit 10, and a smoothing capacitor C21 connected to an output terminal ofthe bridge diodes D23 and D24, for smoothing a full wave-rectified voltage from rectifier 20.

The output power controller 50 includes an FET Q51 for controlling the supply of the DC voltage from the rectifier 20 to the primary coil 61 of the switching transformer 60, a PWM circuit 40 for outputting a control signal to a gate of the FET Q51 through a resistor R51 to periodically turn on/off the FET Q51, and resistors R52 and R53 for detecting an overcurrent of the FET Q51 and applying the detected overcurrent to the PWM circuit 40.

The initial drive voltage controller 30 includes an initial drive voltage supply resistor R31 for supplying a half wave-rectified voltage from the rectifier 20 as the initial drive voltage to the PWM circuit 40 in the output power controller 50, and a switching circuit 32 for supplying or blocking the initial drive voltage to the PWM circuit 40 in response to a full wave-rectified voltage from the rectifier 20. The switching circuit 32 is provided with a transistor Q31 having a base for receiving the full wave-rectified voltage from the rectifier 20 through a resistor R32 and a capacitor C31.

The operation of the SMPS with the above-mentioned construction in accordance with the present invention will hereinafter be described.

First, the external AC voltage Vin is input by the AC input unit 10 and then rectified and smoothed by the bridge diodes D21–D24 and smoothing capacitor C21 in the rectifier 20. As a result, the external AC voltage Vin is converted into a desired DC voltage. The DC voltage from the rectifier 20 is applied respectively to the primary coil 61 of the switching transformer 60 and the switching circuit 32 of initial drive voltage controller 30.

In the initial drive voltage controller 30, the half wave-rectified voltage from the rectifier 20 is supplied as the initial drive voltage to the PWM circuit 40 in the output power controller 50 through the initial drive voltage supply resistor R31 to drive the output power controller 50.

In more detail, in the initial drive voltage controller 30, the half wave-rectified voltage from the rectifier 20 is applied to a collector of the transistor Q31 through the initial drive voltage supply resistor R31.

Also, the full wave-rectified voltage from the rectifier 20 is smoothed by the capacitor C21 and then differentiated by the resistor R32 and capacitor C31 of switching circuit 32. Then, a voltage differentiated by the resistor R32 and capacitor C31 is instantaneously applied to the base of the transistor Q31 to turn the transistor Q31 on.

As a result, the half wave-rectified voltage from the rectifier 20 is applied as the initial drive voltage to the PWM circuit 40 through transistor Q31, when transistor Q31 is turned on.

In the output power controller 50, the DC voltage from the rectifier 20 is applied to a drain of the FET Q51 through the primary coil 61 of the switching transformer 60. At the same time, the PWM circuit 40 is driven in response to the initial drive voltage from the initial drive voltage controller 30 to apply the control signal to the gate of the FET Q51 through the resistor R51. As a result, the FET Q51 is rapidly turned on.

If a voltage at a source of the FET Q51 is rapidly raised due to an increase in current at the drain of the FET Q51, an overcurrent is detected by the resistors R52 and R53 and applied to the PWM circuit 40. As a result, the PWM circuit 40 turns the FET Q51 off.

At the moment that the FET Q51 is turned off, instantaneous counter electromotive forces are generated respectively at the secondary and tertiary coils 62 and 63 of the switching transformer 60, thereby causing current to flow through the diodes D71, D72, D73 and D81 in the first to third output circuits 71–73 and drive voltage supply unit 80.

When the flowing current becomes zero, the FET Q51 is gain turned on.

The voltages, which are induced in the secondary and tertiary coils 62 and 63 of the switching transformer 60 through the above-mentioned switching operation of the output power controller 50, are rectified and smoothed by the diodes D71, D72, D73 and D81 and capacitors C71, C72, C73 and C81 in the first to third output circuits 71–73 and drive voltage supply unit 80, respectively. As a result, the operating voltages $V_A$, $V_B$, $V_C$ and $V_D$ are generated.

Noticeably, the PWM circuit 40 is initially operated in response to the initial drive voltage from the initial drive voltage controller 30. After the lapse of a predetermined time, at the normal state, the PWM circuit 40 is operated in response to the drive voltage $V_D$ from the drive voltage supply unit 80 which is generated on the basis of the voltage induced in the tertiary coil 63 of the switching transformer 60.

At this time, the drive voltage $V_D$ from the drive voltage supply unit 80 is applied to an emitter of the transistor Q31 in the initial drive voltage controller 30. As a result, the transistor Q31 is turned off because of a high voltage level at its emitter. As the transistor Q31 is turned off, the initial drive voltage from the initial drive voltage controller 30 is blocked to the PWM circuit 40 and only the drive voltage $V_D$ from the drive voltage supply unit 80 is supplied to the PWM circuit 40 to drive it at the normal state.

On the other hand, the operating voltage from the load output unit 70, supplied to the load, may be varied according to power consumption of the load. Such a variation is detected by the error detection feedback unit 90 and fed back to the PWM circuit 40. Then, on the basis of the detected variation, the PWM circuit 40 adjusts the output duty ratio of the DC voltage from the rectifier 20 which is applied to the primary coil 61 of the switching transformer 60. Hence, the first to third output circuits 71–73 can supply stable operating voltages to the loads.

As apparent from the above description, according to the present invention, the initial drive voltage is supplied to the output power controller through the initial drive voltage supply resistor. When the normal drive voltage is supplied to the output power controller after the lapse of a predetermined time, the initial drive voltage through the initial drive voltage supply resistor is blocked by the transistor in the switching circuit. Further, the half wave-rectified voltage is supplied as the initial drive voltage to the PWM circuit. Therefore, the present invention has the effect of reducing unnecessary power consumption.

Moreover, the initial drive voltage supply resistor requires no high power capacity because of a reduction in its tendency to overheat.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An initial drive voltage supply control circuit for a switching mode power supply, comprising:
    a rectifier for rectifying and smoothing an alternating current voltage input by an alternating current input unit to convert said alternating current voltage into a direct current voltage;
    a switching transformer having a primary coil for receiving said direct current voltage from said rectifier and having secondary and tertiary coils for inducing desired voltages in response to said direct current voltage received by said primary coil;
    an output power controller for supplying or blocking said direct current voltage from said rectifier to said primary coil of said switching transformer;
    a drive voltage supply unit for rectifying and smoothing the voltage induced in said tertiary coil of said switching transformer to supply a normal drive voltage to said output power controller; and
    an initial drive voltage controller for supplying an initial drive voltage to said output power controller and blocking said initial drive voltage to said output power controller when said normal drive voltage is supplied to said output power controller after the lapse of a predetermined time.

2. The initial drive voltage supply control circuit for a switching mode power supply, as set forth in claim 1, wherein said initial drive voltage controller is adapted to supply a half wave-rectified voltage from said rectifier as said initial drive voltage to said output power controller.

3. The initial drive voltage supply control circuit for a switching mode power supply, as set forth in claim 1, wherein said initial drive voltage controller includes:
    input means for supplying a halfwave-rectified voltage from said rectifier as said initial drive voltage to said output power controller; and
    switching means for supplying or blocking said initial drive voltage from said input means to said output power controller in response to a full wave-rectified voltage from said rectifier.

4. The initial drive voltage supply control circuit for a switching mode power supply, as set forth in claim 3, wherein said switching means includes:
    a resistor for inputting said full wave-rectified voltage from said rectifier;
    a capacitor for smoothing an output voltage from said resistor; and
    a transistor turned on/off in response to the voltage smoothed by said capacitor.

5. The initial drive voltage supply control circuit for a switching mode power supply, as set forth in claim 1, further comprising:
    a load output unit for rectifying and smoothing the voltage induced in said secondary coil of said switching transformer to output an operating voltage to a load; and
    an error detection feedback unit for detecting said operating voltage from said load output unit and feeding the detected operating voltage back to said output power controller.

6. An initial drive voltage supply control circuit for a switching mode power supply, comprising:
    a source for inputting an alternating current voltage;
    a rectifier for receiving said alternating current voltage and outputting a fill wave rectified voltage and a half wave rectified voltage;
    a switching transformer having a primary coil for receiving said full wave rectified voltage from said rectifier and having secondary and tertiary coils for inducing desired voltages in response to said full wave rectified voltage received by said primary coil;
    an output power controller for supplying or blocking said full wave rectified voltage from said rectifier to said primary coil of said switching transformer;
    a drive voltage supply unit for rectifying and smoothing the voltage induced in said tertiary coil of said switching transformer to supply a normal drive voltage to said output power controller;
    first means for supplying said halfwave-rectified voltage from said rectifier as an initial drive voltage to said output power controller; and
    second means for supplying said initial drive voltage from said first means to said output power controller in response to said fill wave-rectified voltage from said rectifier and for blocking said initial drive voltage from said first means to said output power controller when said normal drive voltage is supplied to said output power controller after the lapse of a predetermined time.

7. The initial drive voltage supply control circuit as set forth in claim 6, wherein said second means comprises:
    a resistor for receiving said full wave rectified voltage from said rectifier;
    a capacitor for smoothing an output voltage from said resistor; and a transistor having a base connected to receive the voltage smoothed by said capacitor, a collector coupled to receive said initial drive voltage output from said first means and an emitter commonly connected to said output power controller and said drive voltage supply unit.

8. The initial drive voltage supply control circuit as set forth in claim 7, wherein said first means comprises a resistor.

9. The initial drive voltage supply control circuit as set forth in claim 6, wherein said output power controller comprises:

a pulse width modulator having an input terminal for receiving said initial drive voltage and said normal drive voltage; and a field effect transistor having a gate terminal connected to receive a control signal output from said pulse width modulator via a first resistor, said field effect transistor having a drain terminal connected to receive a voltage induced by said primary coil and source terminal connected to a ground terminal via a second resistor, said source terminal being further connected to said pulse width modulator via a third resistor, said second and third resistors forming an overcurrent detector for detecting an overcurrent in said field effect transistor.

10. The initial drive voltage supply control circuit as set forth in claim 6, further comprising:

a load output unit for rectifying and smoothing the voltage induced in said secondary coil of said switching transformer to output an operating voltage to a load; and an error detection feedback unit for detecting said operating voltage from said load output unit and feeding the detected operating voltage back to said output power controller.

11. An initial drive voltage supply control circuit for a switching mode power supply, comprising:

a rectifier for rectifying and smoothing an alternating current voltage input by an alternating current input unit to convert said alternating current voltage into a direct current voltage;

a switching transformer having a primary coil for receiving said direct current voltage from said rectifier and having secondary and tertiary coils for inducing desired voltages in response to said direct current voltage received by said primary coil;

an output power controller for supplying or blocking said direct current voltage from said rectifier to said primary coil of said switching transformer;

a drive voltage supply unit for rectifying and smoothing the voltage induced in said tertiary coil of said switching transformer to supply a normal drive voltage to said output power controller;

an initial drive voltage controller for supplying an initial drive voltage to said output power controller and blocking said initial drive voltage to said output power controller when said normal drive voltage is supplied to said output power controller after the lapse of a predetermined time;

a load output unit for rectifying and smoothing the voltage induced in said secondary coil of said switching transformer to output an operating voltage to a load; and an error detection feedback unit for detecting said operating voltage from said load output unit and feeding the detected operating voltage back to said output power controller.

12. The initial drive voltage supply control circuit as set forth in claim 11, wherein said initial drive voltage controller includes:

input means for supplying a halfwave-rectified voltage from said rectifier as said initial drive voltage to said output power controller; and switching means for supplying or blocking said initial drive voltage from said input means to said output power controller in response to a full wave-rectified voltage from said rectifier.

13. The initial drive voltage supply control circuit as set forth in claim 12, wherein said switching means includes:

a resistor for receiving said full wave rectified voltage from said rectifier;

a capacitor for smoothing an output voltage from said resistor; and a transistor having a base connected to receive the voltage smoothed by said capacitor, a collector coupled to receive said initial drive voltage output from said input means and an emitter commonly connected to said output power controller and said drive voltage supply unit.

* * * * *